(12) United States Patent
Evans

(10) Patent No.: US 7,774,715 B1
(45) Date of Patent: Aug. 10, 2010

(54) SYSTEM AND METHOD FOR COMPUTER-CREATED ADVERTISEMENTS

(75) Inventor: Jon C. Evans, Sarasota, FL (US)

(73) Assignee: eComSystems, Inc., Sarasota, FL (US)

(*) Notice: Subject to any disclaimer, the term of this patent is extended or adjusted under 35 U.S.C. 154(b) by 694 days.

(21) Appl. No.: 11/316,345

(22) Filed: Dec. 23, 2005

Related U.S. Application Data

(63) Continuation-in-part of application No. 10/690,455, filed on Oct. 22, 2003, now abandoned, which is a continuation-in-part of application No. 09/887,526, filed on Jun. 25, 2001, now Pat. No. 7,315,983.

(60) Provisional application No. 60/213,484, filed on Jun. 23, 2000.

(51) Int. Cl.
*G06Q 30/00* (2006.01)
(52) U.S. Cl. .................... 715/788; 705/14.72
(58) Field of Classification Search ............. 705/14, 705/26, 27, 14.72; 715/854, 747, 716, 764, 715/788, 789
See application file for complete search history.

(56) References Cited

U.S. PATENT DOCUMENTS

| | | |
|---|---|---|
| 5,381,523 A | 1/1995 | Hayashi |
| 5,541,991 A | 7/1996 | Benson et al. |
| 5,555,496 A | 9/1996 | Friedrich et al. |
| 5,649,186 A | 7/1997 | Ferguson |
| 5,680,619 A | 10/1997 | Gudmundson et al. |
| 5,748,484 A | 5/1998 | Cannon et al. |
| 5,749,083 A | 5/1998 | Koda et al. |
| 5,860,073 A | 1/1999 | Ferrel et al. |
| 5,870,718 A | 2/1999 | Spector |
| 5,873,073 A | 2/1999 | Bresnan et al. |
| 5,907,704 A | 5/1999 | Gudmundson et al. |
| 5,926,825 A | 7/1999 | Shirakawa |
| 5,930,810 A | 7/1999 | Farros et al. |

(Continued)

FOREIGN PATENT DOCUMENTS

WO    WO 98/08176    2/1998

OTHER PUBLICATIONS

PageXpress Promotional Materials and User Manual, 1998.

(Continued)

*Primary Examiner*—Andrew Joseph Rudy
(74) *Attorney, Agent, or Firm*—Remenick PLLC

(57) ABSTRACT

The invention relates to a computerized method for a user to create an advertisement by displaying a plurality of advertising formats for selection by a user; displaying a template corresponding to a selected advertising format; displaying a plurality of product references for selection by the user; displaying on the template a selected product reference to create a proposed advertisement; and creating a preview of the proposed advertisement, all of which may be implemented using the Internet. The invention further relates to a computerized system for creating an advertisement that comprises a template database for storing advertising formats; a product database for storing product references; and a computer to access the databases. Preferably, the user has a network interface such as Internet access that permits access via a remote location, software to permit a user to specify specifications such as quantity, printing information, ship date, paper type, pricing information, and payment information, and may be configured to receive images and text for new products.

31 Claims, 10 Drawing Sheets

U.S. PATENT DOCUMENTS

| | | | |
|---|---|---|---|
| 5,933,811 | A | 8/1999 | Angles et al. |
| 5,956,736 | A | 9/1999 | Hanson et al. |
| 5,963,968 | A | 10/1999 | Warmus et al. |
| 5,983,227 | A | 11/1999 | Nazem et al. |
| 5,983,243 | A | 11/1999 | Heiney et al. |
| 5,987,454 | A | 11/1999 | Hobbs |
| 5,999,912 | A | 12/1999 | Wodarz et al. |
| 6,005,560 | A | 12/1999 | Gill et al. |
| 6,009,410 | A | 12/1999 | LeMole et al. |
| 6,026,417 | A | 2/2000 | Ross et al. |
| 6,052,514 | A | 4/2000 | Gill et al. |
| 6,064,967 | A | 5/2000 | Speicher |
| 6,081,262 | A | 6/2000 | Gill et al. |
| 6,094,186 | A | 7/2000 | Kuroda et al. |
| 6,108,673 | A | 8/2000 | Brandt et al. |
| 6,118,449 | A | 9/2000 | Rosen et al. |
| 6,119,101 | A * | 9/2000 | Peckover ..................... 705/26 |
| 6,144,944 | A | 11/2000 | Kurtzman et al. |
| 6,167,382 | A | 12/2000 | Sparks et al. |
| 6,182,050 | B1 | 1/2001 | Ballard |
| 6,192,382 | B1 | 2/2001 | Lafer et al. |
| 6,216,112 | B1 | 4/2001 | Fuller et al. |
| 6,243,375 | B1 * | 6/2001 | Speicher ..................... 370/352 |
| 6,247,047 | B1 | 6/2001 | Wolff |
| 6,286,005 | B1 | 9/2001 | Cannon |
| 6,311,211 | B1 * | 10/2001 | Shaw et al. ................. 709/206 |
| 6,334,109 | B1 | 12/2001 | Kanevsky et al. |
| 6,385,592 | B1 | 5/2002 | Angles et al. |
| 6,401,075 | B1 * | 6/2002 | Mason et al. ............ 705/14.72 |
| 6,446,045 | B1 * | 9/2002 | Stone et al. ................... 705/26 |
| 6,473,794 | B1 * | 10/2002 | Guheen et al. ............. 709/223 |
| 6,484,149 | B1 * | 11/2002 | Jammes et al. ............... 705/26 |
| 6,496,857 | B1 | 12/2002 | Dustin et al. |
| 6,513,035 | B1 | 1/2003 | Tanaka et al. |
| 6,519,571 | B1 | 2/2003 | Guheen et al. |
| 6,553,178 | B2 | 4/2003 | Abecassis |
| 6,589,292 | B1 | 7/2003 | Langford-Wilson |
| 6,604,088 | B1 | 8/2003 | Landom et al. |
| 6,611,348 | B1 | 8/2003 | Chase et al. |
| 6,611,349 | B1 | 8/2003 | Vogt et al. |
| 6,628,314 | B1 | 9/2003 | Hoyle |
| 6,633,666 | B2 | 10/2003 | Gill et al. |
| 6,671,818 | B1 * | 12/2003 | Mikurak ........................ 714/4 |
| 6,684,369 | B1 | 1/2004 | Bernardo et al. |
| 6,691,093 | B2 * | 2/2004 | Shell ........................... 705/26 |
| 6,718,551 | B1 | 4/2004 | Swix et al. |
| 6,725,203 | B1 | 4/2004 | Seet et al. |
| 6,738,155 | B1 | 5/2004 | Rosenlund et al. |
| 6,738,978 | B1 | 5/2004 | Hendricks |
| 6,763,334 | B1 | 7/2004 | Matsumoto et al. |
| 6,763,336 | B1 | 7/2004 | Kolls |
| 6,792,466 | B1 | 9/2004 | Saulpaugh |
| 6,799,327 | B1 | 9/2004 | Reynolds et al. |
| 6,804,659 | B1 | 10/2004 | Graham |
| 6,829,587 | B2 | 12/2004 | Stone et al. |
| 6,829,780 | B2 | 12/2004 | Kraft |
| 6,847,969 | B1 | 1/2005 | Mathal |
| 6,865,262 | B1 | 3/2005 | Mitts |
| 6,920,606 | B1 | 7/2005 | Jablonski |
| 6,931,591 | B1 * | 8/2005 | Brown et al. ................. 715/205 |
| 6,940,518 | B2 | 9/2005 | Minner et al. |
| 6,947,959 | B1 | 9/2005 | Gill |
| 6,976,003 | B1 | 12/2005 | Hamor |
| 6,976,006 | B1 | 12/2005 | Verma et al. |
| 7,062,466 | B2 | 6/2006 | Wagner |
| 7,072,858 | B1 | 7/2006 | Litzow |
| 7,103,904 | B1 * | 9/2006 | Blackketter et al. ........... 725/32 |
| 7,107,522 | B1 * | 9/2006 | Morgan et al. .............. 715/201 |
| 7,109,985 | B2 * | 9/2006 | Spencer et al. .............. 345/418 |
| 7,120,591 | B1 * | 10/2006 | Solomon et al. ......... 705/14.34 |
| 7,143,066 | B2 * | 11/2006 | Shear et al. ................... 705/54 |
| 7,143,160 | B2 * | 11/2006 | Tamaki ...................... 709/224 |
| 7,149,698 | B2 * | 12/2006 | Guheen et al. ................. 705/1 |
| 7,159,175 | B2 * | 1/2007 | Ishii et al. .................... 715/716 |
| 7,165,041 | B1 * | 1/2007 | Guheen et al. ................ 705/26 |
| 7,181,445 | B2 * | 2/2007 | Bebo et al. ...................... 707/3 |
| 7,188,137 | B2 | 3/2007 | Inoue |
| 7,200,853 | B2 * | 4/2007 | Kawai ........................ 725/34 |
| 7,213,027 | B1 * | 5/2007 | Kominek et al. ............ 707/102 |
| 7,240,025 | B2 * | 7/2007 | Stone et al. ................... 705/26 |
| 7,249,059 | B2 * | 7/2007 | Dean et al. .................... 705/26 |
| 7,266,733 | B2 * | 9/2007 | Bazinet et al. ................. 714/45 |
| 7,292,723 | B2 * | 11/2007 | Tedesco et al. .............. 382/159 |
| 7,312,772 | B2 | 12/2007 | Kim |
| 7,315,983 | B2 * | 1/2008 | Evans et al. .................. 715/713 |
| 7,319,976 | B1 * | 1/2008 | Peckover ................. 705/14.36 |
| 7,343,354 | B2 * | 3/2008 | Hennessey .................. 705/400 |
| 7,403,978 | B2 | 7/2008 | Parekh |
| 7,418,451 | B2 | 8/2008 | Leung |
| 7,421,467 | B2 * | 9/2008 | Kaneko et al. .............. 709/201 |
| 7,434,160 | B2 * | 10/2008 | Peiro et al. ................... 715/249 |
| 7,469,245 | B2 * | 12/2008 | Skillen et al. ................... 707/3 |
| 7,480,693 | B2 | 1/2009 | Kaneko |
| 7,483,946 | B2 * | 1/2009 | Boyd ........................ 709/204 |
| 7,493,648 | B2 | 2/2009 | Hisamatsu |
| 7,496,943 | B1 * | 2/2009 | Goldberg et al. .............. 725/22 |
| 7,533,034 | B2 * | 5/2009 | Laurin et al. .................... 705/7 |
| 7,548,874 | B2 * | 6/2009 | Kanevsky et al. ............. 705/14 |
| 7,653,603 | B1 * | 1/2010 | Holtkamp et al. ............. 705/72 |
| 2007/0266326 | A1 | 11/2007 | Evans et al. |
| 2008/0120185 | A1 | 5/2008 | Evans et al. |
| 2008/0126204 | A1 | 5/2008 | Evans et al. |
| 2008/0126205 | A1 | 5/2008 | Evans et al. |
| 2008/0183577 | A1 | 7/2008 | Evans et al. |

OTHER PUBLICATIONS

Page Perfect Promotion Materials and User's Manual, 2000.
Page Perfect User Guide.
Purchase Order 10744, 1999.
Invoice 24437, 1999.
Invoice 25021, 1999.
Memorandum Rick Davis to Bill Hurley, 1999.
E-mail from hostmaster@internic.net., 1999, registration of adsembly.com.
E-mail from hostmaster@internic.net., 1999, registration of adsembly.net.
Safeway Project Review.
ADsembly Help Guide (ADsembly Importer and ADsembly Preflight).
Response to Supervalu RFP, 2000.
Supervalu Questions and Answers, 1999.
Supervalu ADsembly Workflow, 2000.
Supervalu ADsembly Help Guide, 2000.
Supervalu Questions and Answers 1999.
Catalog Maker, 1997.

* cited by examiner

SYSTEM AND METHOD FOR COMPUTER-CREATED ADVERTISEMENTS

REFERENCE TO RELATED APPLICATIONS

This application is a continuation-in-part of U.S. patent application Ser. No. 10/690,455 filed Oct. 22, 2003 now abandoned, entitled "System And Method For Computer-Created Advertisements", which is a continuation-in-part of U.S. patent application Ser. No. 09/887,526, filed Jun. 25, 2001 now U.S. Pat. No. 7,315,983, entitled "System And Method For Computer-Created Advertisements", which claims priority to U.S. provisional application Ser. No. 60/213,484, filed Jun. 23, 2000, entitled "Internet Advertising Design Build Model", all of which are hereby specifically and entirely incorporated by reference.

BACKGROUND OF THE INVENTION

1. Field of the Invention

This invention relates to business models, methods and systems for generating advertising materials useful for all forms of advertisement. More particularly, this invention relates to computerized systems and methods for creating advertisements.

2. Description of the Background

Conventional business methods for creating advertising require that written materials and other documentation be provided by a customer (which we will refer to herein as the user) to third party graphic artists who design the layout. The customer must wait to receive a hard-copy proof from the artists, and then, after reviewing and revising the proof, resend the proof to the artists for redesign. When the proof is finally approved, the information must be delivered to a commercial printer to produce the advertisements in their final form. At each stage of the process, there can be substantial delays. After one or more redesigns, the customer must wait for a final proof and then, once approved, wait for the final product to be produced.

The conventional process is time consuming and inefficient, and can also be very expensive relative to the cost of services that can be provided by the present invention. For example, a customer must employ the services of a graphic artist, which can add significant cost to the process. Moreover, the inclusion of a graphic artist into the process requires additional time and communications between the artist and the customer. Each time the work-in-process is transferred between parties (for example, from the graphic artist to the customer, from the customer to the graphic artist, and from the graphic artist to the printer), the work-in-process must enter the queue of the recipient, which may add uncontrollable delays, not to mention the time associated with the logistics of transferring materials. Accordingly, there is a need for an improved system that is less time consuming and less costly.

SUMMARY OF THE INVENTION

The present invention relates to methods and systems for creating advertisements. The present invention uses computers and software to create efficiencies in designing and printing advertisements. The present invention also contemplates the use of the Internet to streamline the processes.

Disclosed herein is a computerized method for a user to create an advertisement, comprising the steps: displaying on a computer a plurality of advertising formats for selection by the user; displaying on the computer, in response to selection by the user, a template that corresponds to a selected one or more of the plurality of advertising formats; displaying on the computer a plurality of product references for selection by the user; displaying on the template at least one selected product reference to create a proposed advertisement; and creating a preview of the proposed advertisement. The method may also involve submitting specifications to a remote site and printing advertisements in accordance with the specifications. Remote sites are preferably commercial printers, but may also be printers in another office, at another location or in a different country.

Also disclosed is an Internet-based method for a user to create an advertisement, comprising the steps: accessing a web site through a computer; displaying on the computer a plurality of advertising formats for selection by the user; displaying on the computer, in response to selection by the user, a template that corresponds to a selected one or more of the plurality of advertising formats; displaying on the computer a plurality of product references for selection by the user; displaying on the template at least one selected product reference to create a proposed advertisement; submitting to a remote site, via the internet, electronic files of the proposed advertisement, specifications for the proposed advertisement, the specifications including at least one of a quantity, a paper size, printing specifications, drop shipping information, and a payment method; creating, at the remote site, a preview of the proposed advertisement which may be a hard-copy proof or an electronic or other preview; making the preview available to the user for review; and printing, in accordance with set printing specifications, advertisements that correspond to the proposed advertisements. The method may also provide the user with the ability to enter information concerning custom product references, such that the custom product references may be displayed on the template along with product references selected from the displayed plurality of product references.

A computerized system for creating an advertisement is also disclosed. The system comprises: a template database for storing a plurality of advertising formats; a product database for storing a plurality of product references; a computer that has access to the template database and the product database. The computer accesses software that is capable of incorporating: a template selector for selecting at least one template from the template database; a product selector for selecting at least one product reference from the product database, each of the at least one product reference including at least one of an image and text; and a design interface for controlling the placement of a selected product reference on a selected template in order to create a proposed advertisement. The computer may also have a network interface (such as an interface to the Internet) that permits access to the software on the computer via a remote location so that a user may access the software on the computer in order to create a proposed advertisement. The computer may also include software to create a specifications interface for inputting specifications (for example, quantity, printing information, shipping information and destination, pricing information, paper type, and payment information) for the advertisement.

Also disclosed is a computerized system for creating an advertisement, comprising: a template database for storing a plurality of advertising formats; a product database for storing a plurality of product references; and a computer that has access to the template database and the product database. The computer accesses software that is capable of incorporating: a template selector for selecting at least one template from the template database; a product input interface for adding new product references to the template database; a product selector for selecting at least one product reference from the product database, each of the at least one product reference including at least one of an image and/or text; and a design interface for controlling the placement of a selected product reference on a selected template in order to create a proposed advertisement. The computer is also configured to include a network interface that permits access to the computer via a computer network connection such as, for example, an Internet or other broadband-based connection, a modem, a networked computer, or combinations thereof so that a user may access the computer to create a proposed advertisement. The system may also include an input for receiving an image (for example, from a digital camera) and textual information concerning new products, and a data marker for linking the digital data and the image.

An Internet-based method for a user to create an advertisement is also disclosed. The method comprises: accessing a web site through a computer, the web site being hosted on a host computer, and the host computer having access to a first database of advertising formats and a second database of product references; accessing the first database to identify a plurality of advertising formats; displaying on the computer the plurality of advertising formats for selection by the user; displaying on the computer, in response to selection by the user, a template that corresponds to a selected one or more of the plurality of advertising formats; accessing the second database to identify a plurality of product references; displaying on the computer the plurality of product references for selection by the user; displaying on the template at least one selected product reference to create a proposed advertisement; submitting to a remote site, via the Internet, electronic files of the proposed advertisement, specifications for the proposed advertisement, the specifications, file name, user information, and final files that constitute the proposed advertisement including at least one of a quantity, printing specifications, a ship date, a paper type, and a payment method; creating, at the remote site, a preview of the proposed advertisement (e.g. hard-copy proof, electronic preview, printer's proof, the final file of the proposed advertisement); and printing, in accordance with the printing specifications, shipping and destination information, pricing and payment information, advertisements that correspond to the proposed advertisements. The method may also involve displaying on the computer a menu such as, for example, a drop-down or pop-up menu, that permits new custom product references to be entered into the second database.

Also disclosed are a method and system whereby a user operates a computer to create an advertisement. This method comprises the steps: selecting an advertising format from a plurality of advertising formats; displaying a template that corresponds to a selected advertising format, which template includes a plurality of advertising areas; selecting a product reference, which product reference comprises at least one of an image and text; and importing the selected product reference onto an advertising area to create an advertisement. Preferably, the advertising area is configured to automatically format the selected product reference to fit within physical dimensions of the advertising area.

A method and system for creating an advertisement are also disclosed. This method comprises: selecting an advertising format; displaying a template that corresponds to a selected advertising format, which template includes a plurality of advertising areas; selecting a plurality of product references; specifying a rule of priority for laying out the plurality of product references onto the plurality of advertising areas; and generating an advertisement whereby the plurality of product references are placed onto the plurality of advertising areas in accordance with the rule of priority.

The present invention overcomes the problems and disadvantages associated with conventional methods and systems including electronic systems, and provides new business methods and systems whereby a user can access host computer or server (for example, by way of a web site on the Internet), and quickly and efficiently create customized advertising materials.

The system provides a co-op calculation feature that allows users to enter advertising expenses into the system. This provides for instant and convenient reporting and tracking of advertising information and allows users to more quickly calculate co-op requests which, in turn, allows users to more quickly submit co-op requests to manufacturers which, in turn, allows users to more quickly receive reimbursement. This also provides an advertising tracking tool which allows the user to view advertising activity by dealer, region or at large, determine which products or manufacturers are being advertised, track sales vs. advertising expenditures, compare advertising productivity annually, and track other desired cycles, trends, and facts. The co-op calculation feature calculates the space allotted to each product advertised, divides the total expense by the space for each product, and then applies a co-op amount, optionally 50% of the total cost per ad area. The co-op calculation feature may also be used to generate a variety of reports, which can be customized for a client. The reports generated may include, for example, a general report of all products advertised in any given ad, and individual reports for each product.

The system also provides for uploading a standard, formatted database for each user. This allows the user to easily manage the database; the user can add, delete, or modify entries in the database. In addition, demographic information may be provided for an entry. Examples of such demographic information are buying habits, customer information, product preferences, zip code, area code, etc. The database can then be sorted by the desired demographic information to generate a target list. This list may then be sent along with, sent separately from, sent as an attachment to, and/or embedded within an advertisement which is sent to a remote printer of the user or even to a printing company or mailing service, which list can then produce labels for direct mailing purposes for the advertisement. The list may also be downloaded to or by the user so that the list may be formatted by the user for printing labels on a local printer. The database may also be downloaded by the user at any time for other purposes, such as consolidation of information into the user's management system.

The system also provides for support of images, including text, logos, etc., with transparent backgrounds; this improves the aesthetics of the advertisements and allows for a more finished appearance, i.e., a more retail look. More particularly, the system allows the user to place images anywhere on a page, with the colored background of the ad surrounding the image, so that the user is no longer constrained to place an image into a white box. The system also allows the user to overlap ad elements and to create layers and dynamically direct the placement of ad elements anywhere in the ad.

These features may be used, or not, as desired for any particular job.

Other embodiments and advantages of the invention are set forth in part in the description which follows, and in part, will be obvious from this description, or may be learned from the practice of the invention.

DESCRIPTION OF THE INVENTION

Figure 1:
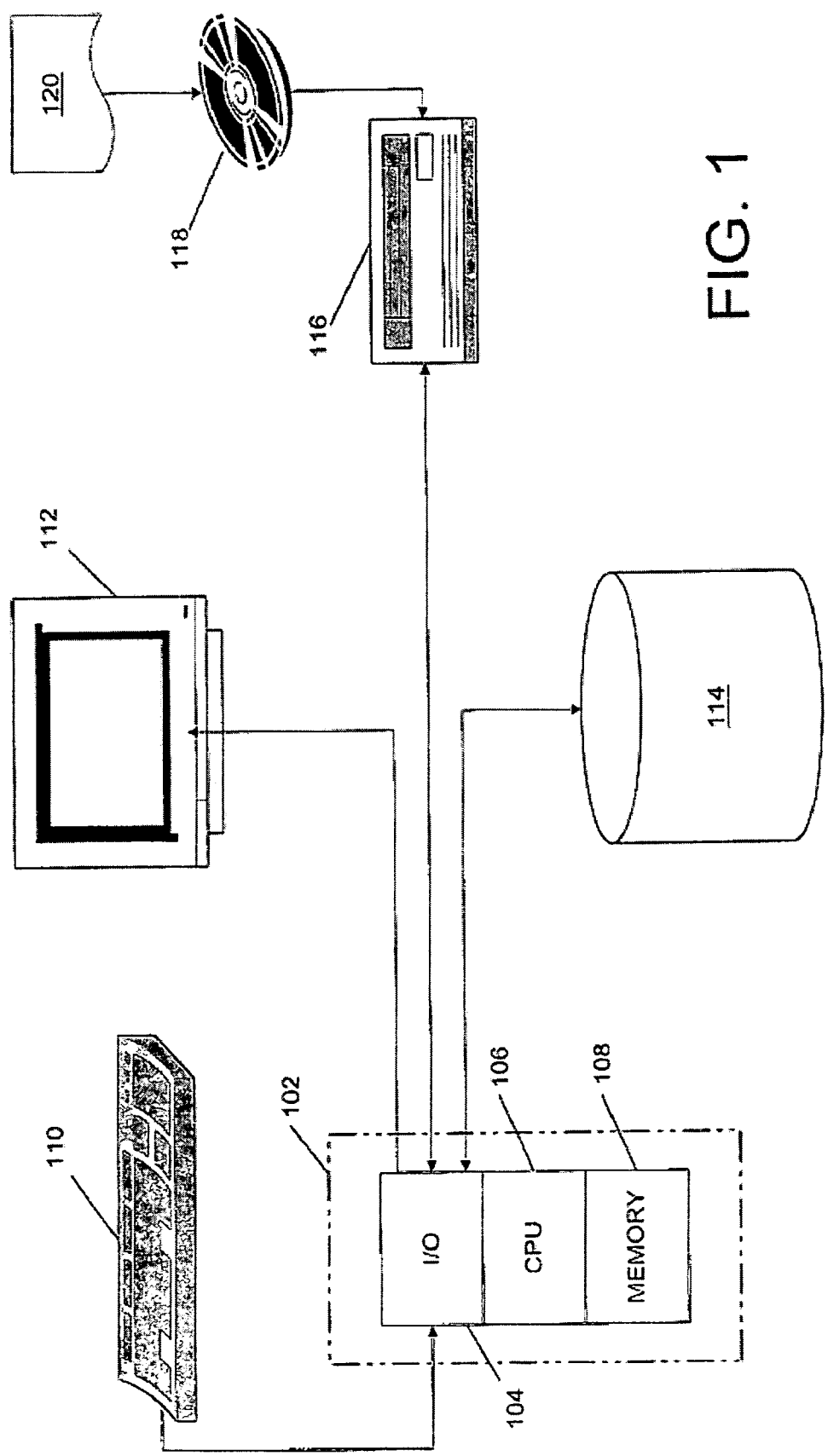
FIG. 1 depicts a general purpose computer system.

A technical advantage of the present invention is that it may be used to significantly reduce the amount of time involved in preparing advertisements. The amount of time reduction is surprising. As a result of the time reductions realized, materials can be submitted weeks in advance—instead of months (which was previously the norm for some users). In some cases, advertising materials can be created in a matter of hours (and possibly minutes in the cases of one page advertisements).

Another technical advantage of the present invention is that it may be used to significantly reduce the cost involved in preparing advertisements. The cost savings is surprising.

Another technical advantage of the present invention is that the method and systems permit a user to create high quality advertisement materials without the services of a graphic artist, thereby realizing unexpected savings in time and expense.

Another technical advantage of the present invention is that the method and systems permit a user to direct the electronic transfer of a final or non-final advertising file to a commercial printer (which can be local, within the same city, or distant, outside the country) or other destination such as, for example, a desk top printer, an e-mail account, a website, or a facility for further processing.

Another technical advantage of the present invention is that the method and systems permit a user to eliminate the time associated with certain queues (e.g., the queue of the graphic artist who designs a layout for an ad), thereby realizing unexpected savings in time.

Another technical advantage of the present invention is that the method and systems permit a user to print its own advertisements, which will result in greater control over printing costs and timing. Printing "in house" also eliminates the delay of queues that may exist when projects are delivered to a commercial printer.

Another benefit of the present invention is that it allows users to react quickly to changing market conditions, thereby enhancing the ability of the user to influence sales and profits.

Another technical advantage of the present invention is that the method and systems are easily used, and the databases are easily updated.

Another technical advantage of the present invention is that the method and systems are easily customized to provide a unique look for each user, and to provide uniformity from advertisement to advertisement, thereby, helping a user to create branding among its trademarks.

Another technical advantage of the present invention is that the method and systems provide cost-effective advertisement services, well below the rates charged by professional designers.

Another technical advantage of the present invention is that, if used by, for example, a corporation which provides the software to its distribution network, the corporation has greater control over creative treatments and branding while still allowing users to locally customize content for custom messages.

Another technical advantage of the present invention is that the method and systems permit a user to maintain up-to-date product databases in order to facilitate the creation of accurate and current advertisements.

Another technical advantage of the present invention is that the method and systems facilitate the provision of services to users who desire to have another person or entity create and maintain user product databases.

Another technical advantage of the present invention is that the method and systems permit flexibility in the creation of advertisements, in the sense that advertisements may be created using any number of colors, as well as in black and white.

Another technical advantage of the present invention is that the method and systems are easily used, and the databases are easily updated.

Another technical advantage of the present invention is that the method and systems can be easily updated through software upgrades to include the latest fashions in advertisement design services.

Another technical advantage of the present invention is that the method and systems are modified to provide links to other web pages so that the latest information concerning new and existing products can be integrated into the databases of the present system, as well as to provide access to others so that they can obtain the latest information about a user's products and services.

Another technical advantage of the present invention is that the method and systems permit a service provider (one who operates the present invention) to calculate and prepare a co-op report for each user. Moreover, the software associated with the method and systems of the present system permit a service provider to process orders and arrange payment to a printer on behalf of a user.

Another technical advantage of the present invention is that the method and systems permit a user to rapidly create high quality advertisement materials.

Another technical advantage of the present invention is that the method and systems permit the use of the Internet as a platform for the development and product of new advertising materials, thereby providing a fast and technologically sophisticated method for creating advertising. The system of the invention permits even a novice to easily create sophisticated advertisements.

The preferred embodiment of the present invention and its advantages are best understood by referring to FIGS. 1 through 7 of the drawings, like numerals being used for like and corresponding parts of the various drawings.

Referring to FIG. 1, a general purpose computer for use with the present invention is provided. Processor 102 has input/output section 104, central processing unit 106, and memory section 108. Input/output section 104 may be connected to keyboard 110, display unit 112, disk storage unit 114, and CD-ROM drive unit 116. CD-ROM unit 116 can read a CD-ROM medium 118, which typically contains programs and data 120. In one embodiment, the general purpose computer may lack some or all of the features described above. For example, the general purpose computer may operate as a terminal, an emulator, etc. with network access.

Figure 2:
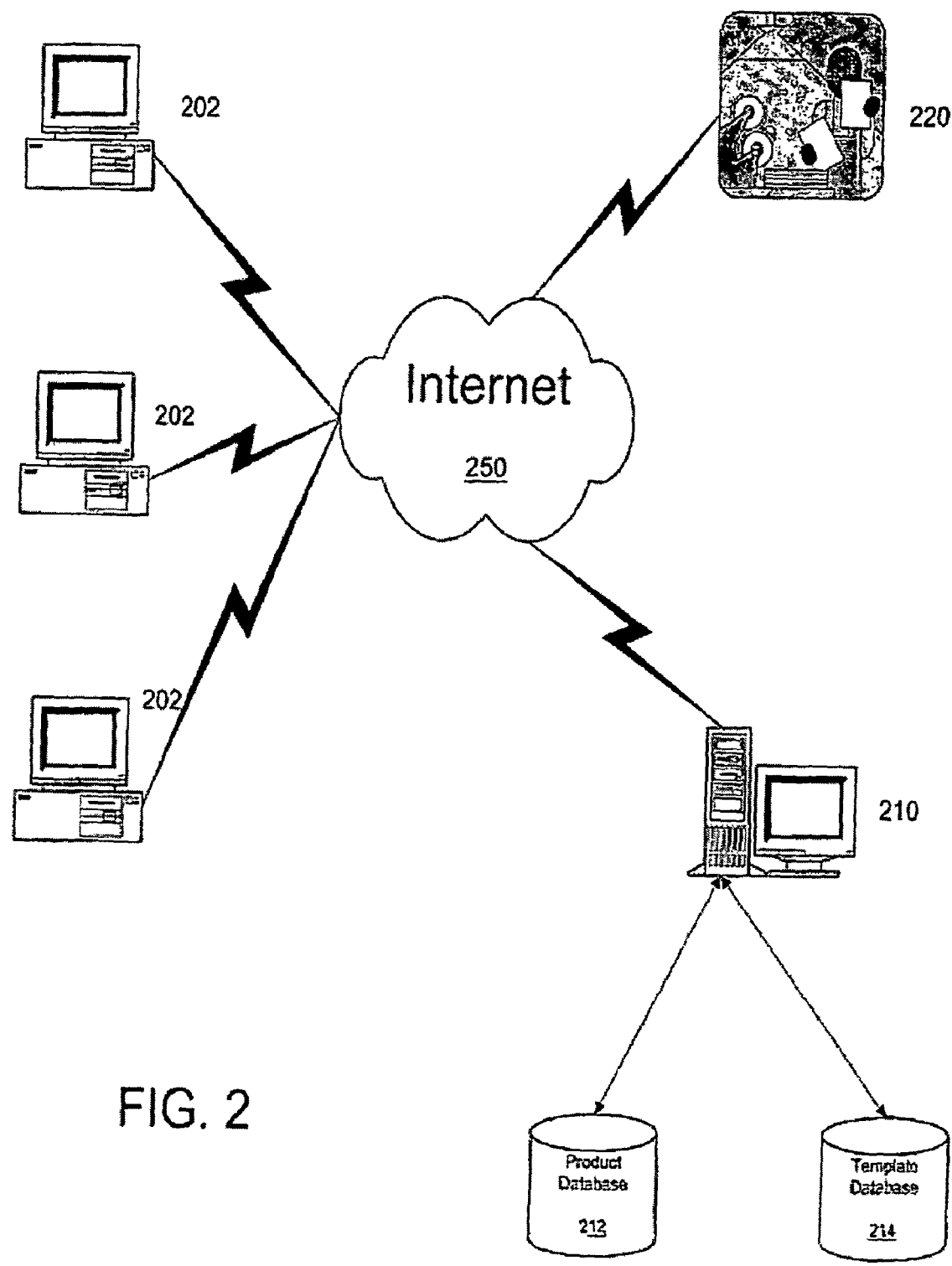
FIG. 2 illustrates a schematic of one embodiment of one configuration of the invention.

The present invention is directed to a system for computer-created advertisements. Referring to FIG. 2, a system according to one embodiment of the present invention is provided. The system may include a plurality of network access devices 202, such as the general purpose computer described in FIG. 1, may be used. In one embodiment, network access devices 202 may include wireless devices, including wireless Personal Digital Assistants ("PDAs") (e.g., Palm™ VII, Research in Motion's Blackberry™), wireless web-enabled phones, pagers, etc.

Network access device 202 may interface with at least one network 250. Network 250 may include the Internet, one or more Local Area Networks ("LANs"), one or more Metropolitan Area Networks ("MANs"), one or more Wide Area Networks ("WANs"), one or more Intranet, etc. An interface between network access device 202 and network 250 may be provided as is known in the art. By way of example, and without limitation, the interface may be provided by unshielded twisted pair wiring, such as CAT-5, coaxial cable, telephone lines, fiber optic cables, or any other suitable communication medium. In one embodiment, network access devices 202 may interface with network 250 via a wireless interface.

Server 210 may support the software used in conjunction with the present invention. In one embodiment, server 210 may access product database 212 and template database 214, which will be discussed in greater detail below. Server 210 may access network 250 in a manner as described above.

In one embodiment, printer 220 may be provided. Printer 220 may produce electronic or hard copies of the advertisement, as will be discussed in greater detail below. Printer 220 may access network 250 in a manner as described above. Printer 220 may also be a remote printing facility.

In another embodiment, the final electronic advertisement may be posted to a website, e-mailed electronically, attached to or placed within other electronic files, etc.

Figure 3:
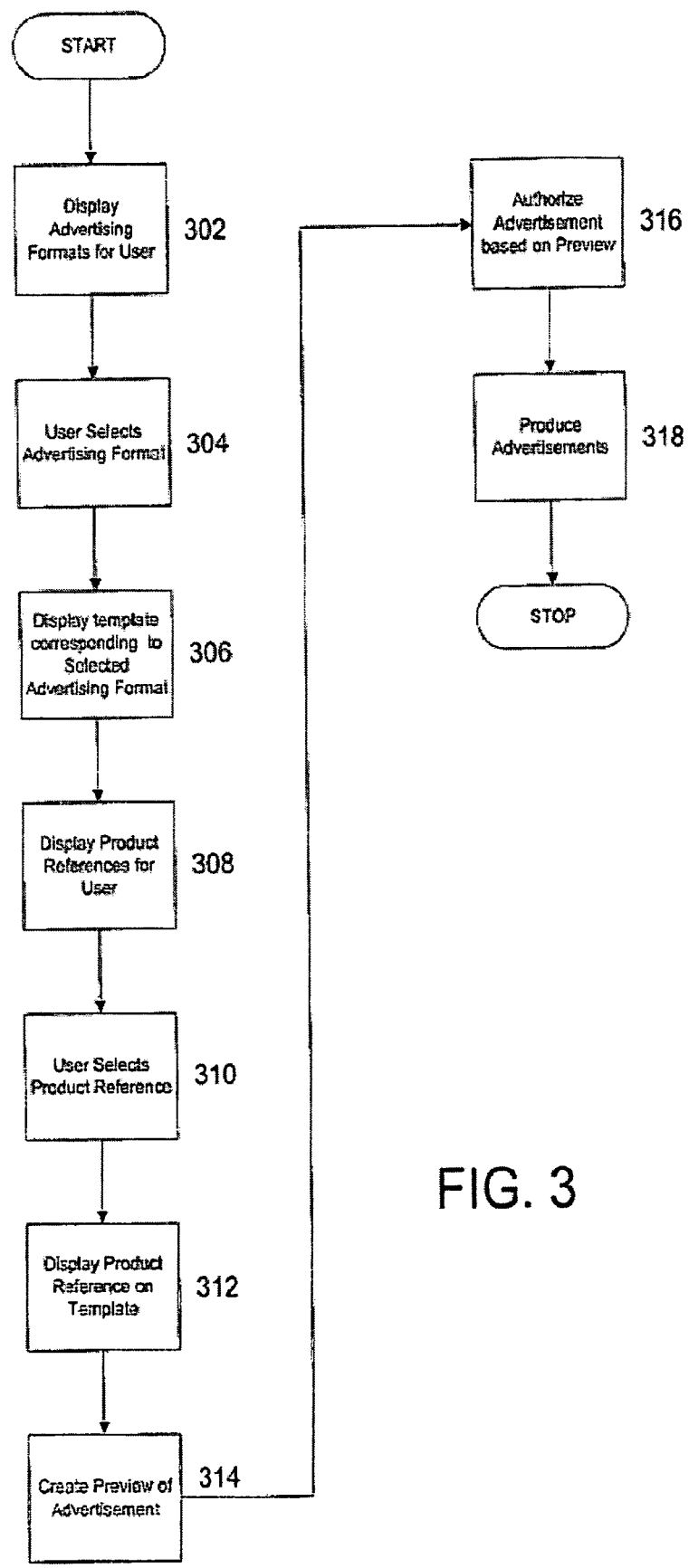
FIG. 3 illustrates a schematic of one embodiment of one process of the invention.
Figure 4:
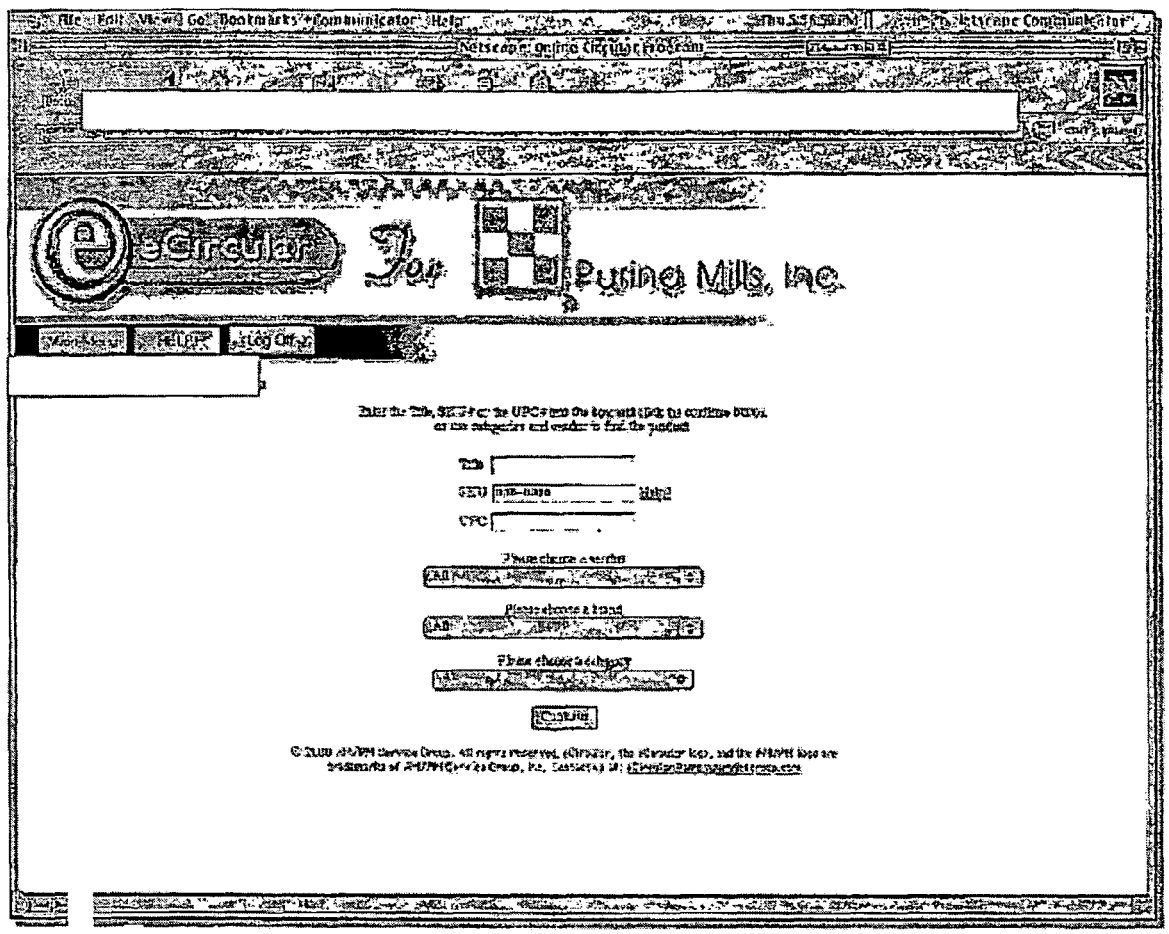
FIG. 4 illustrates a template for selection of a product by vendor, brand or category.
Figure 5:
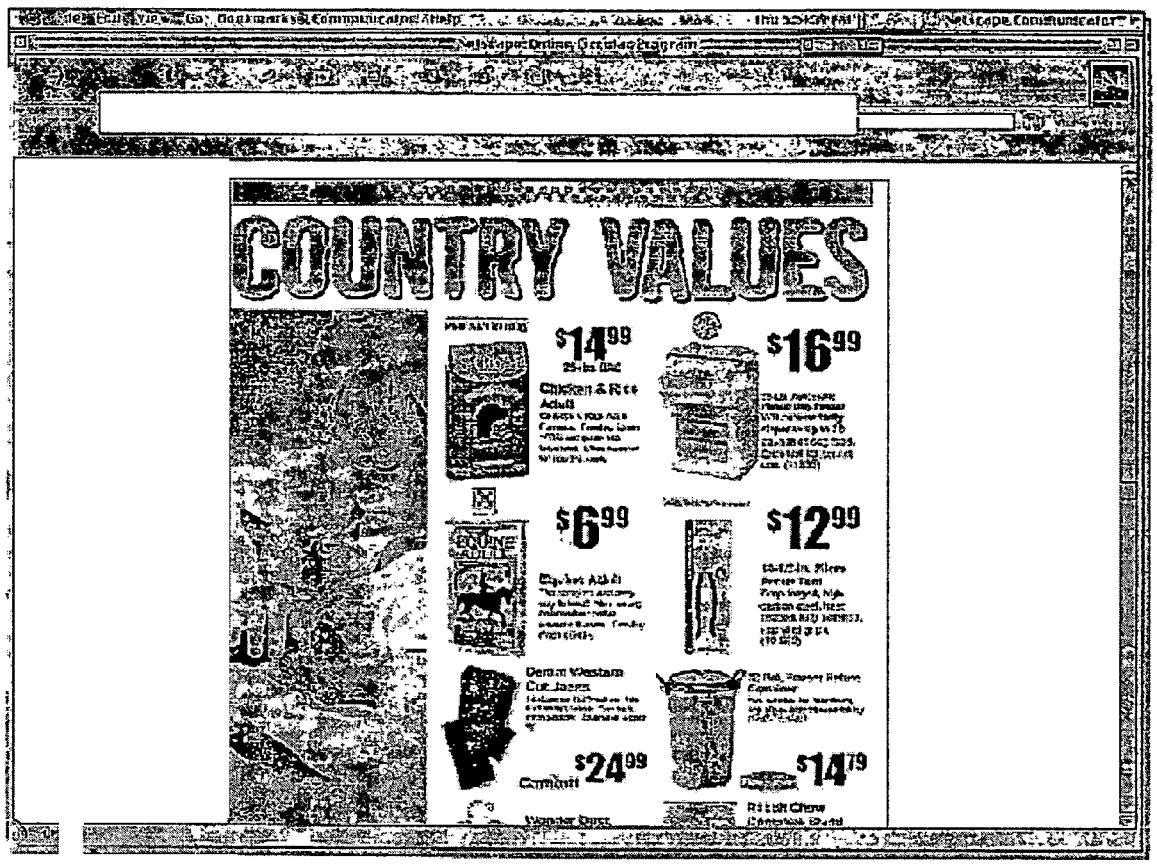
FIG. 5 illustrates available product reference options for the particular vendor selected from FIG. 4.
Figure 6:
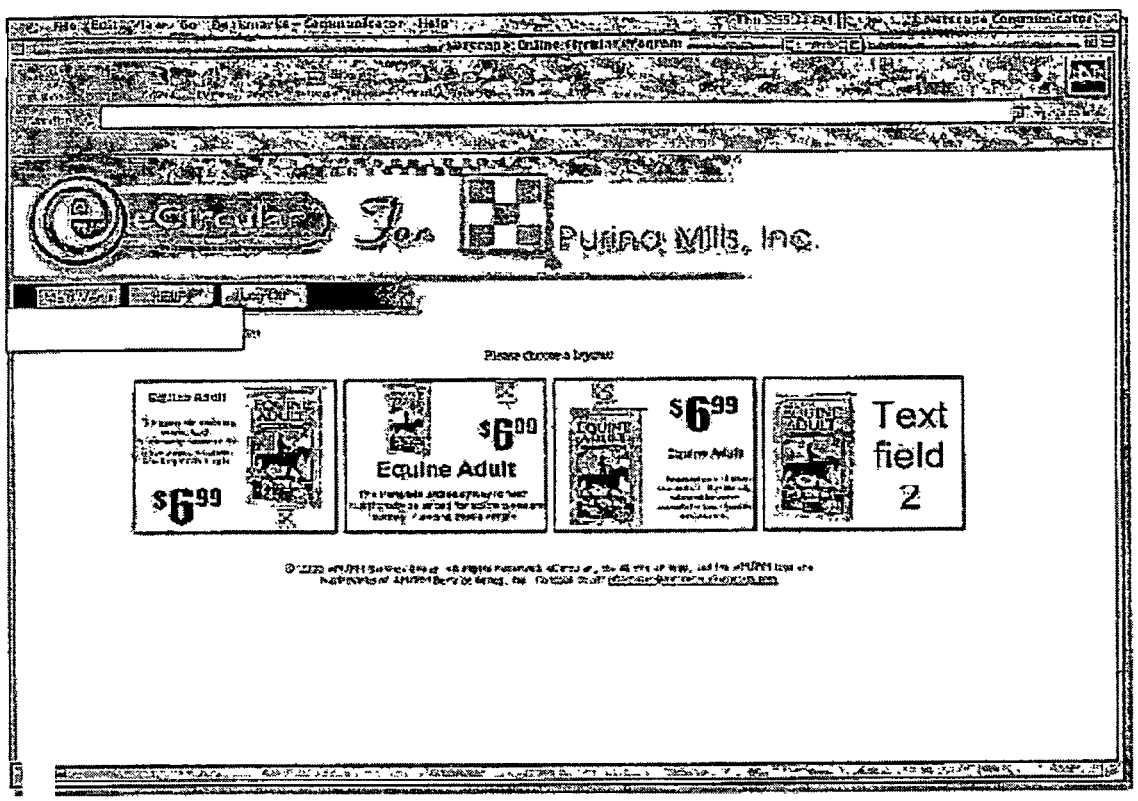
FIG. 6 illustrates available product reference options for the particular product selected from FIG. 5.
Figure 7:
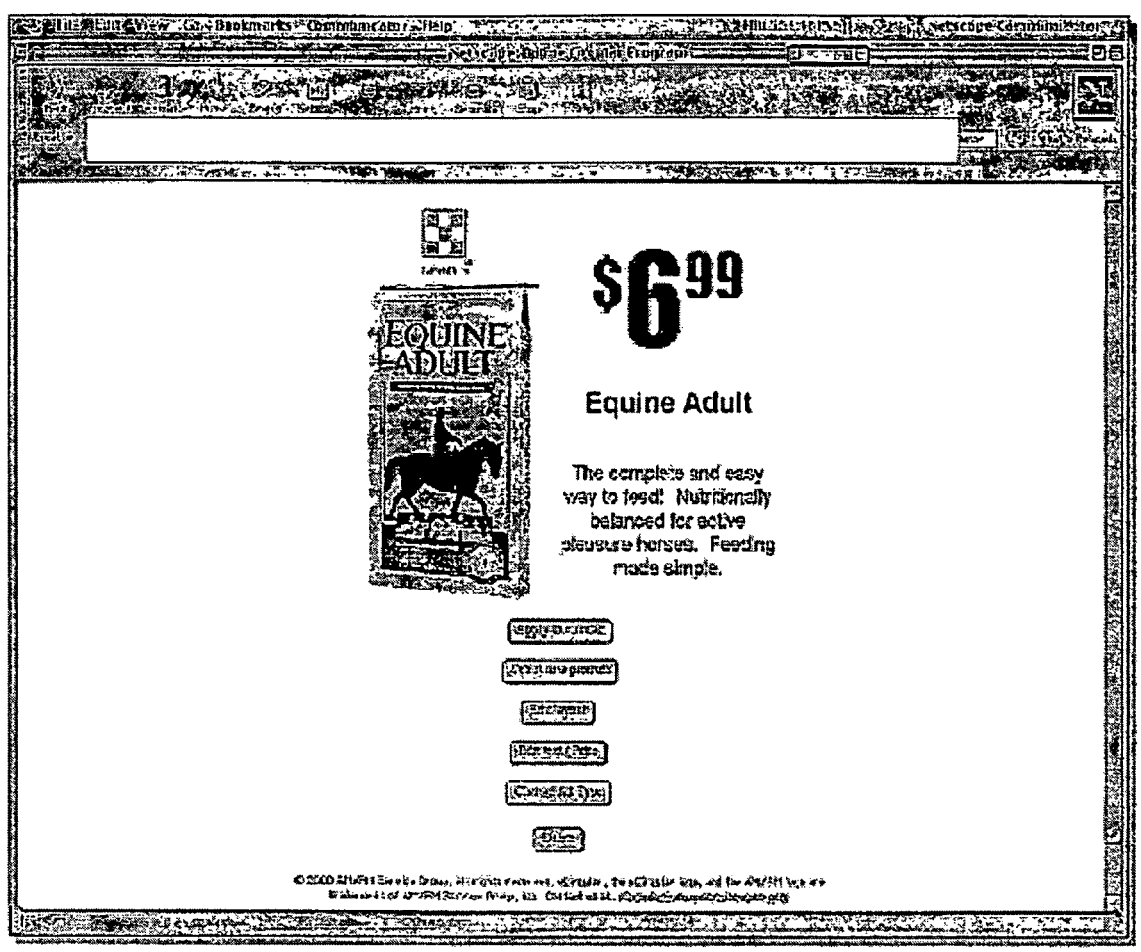
FIG. 7 illustrates incorporation of the product reference selected from FIG. 6 into the final advertisement.

In another embodiment of the present invention, and referring to FIG. 3, a method for computer-created advertisements according to one embodiment of the present invention is provided. In step 302, advertising formats are displayed for the user. In step 304, the user selects an advertising format to use. In step 306, at least one template corresponding to the selected advertising format may be displayed. In step 308, at least one product reference is displayed for the user. The product reference(s) displayed may be based upon a user search for a product reference. In step 310, the user selects at least one product reference. In step 312, the selected product reference may be displayed on the template. In step 314, a preview of the advertisement may be created for the user. In step 316, the user may review the preview, and, if satisfactory, may authorize the production of the advertisement. In step 318, the advertisement may be produced, in an electronic format, in a printed format, etc.

Sample screenshots that correspond to steps in the method of FIG. 3 are provided as FIGS. 4-7. A detailed discussion of the method of FIG. 3 will be provided, below.

In a preferred embodiment of the present inventions, the systems and methods utilize a program that is template-based and includes a database of products offered by a user. The template and its "look" are preferably controlled by the company manufacturing or supplying the products to permit the user to create a consistent and desirable public image, while simultaneously allowing the user flexibility in specifying the content of its advertisements. Predetermined descriptions, graphics, logos, images and associated items may be stored in a database for ease of navigation, but the flexibility of inserting a custom price and description for the various products may also be provided to the user. Preferably, the program may be customized for each user to give the user's advertisements a distinctive design and functionality.

In another preferred embodiment, a user may specify the number of pages to be included in an advertisement, as well as certain printing specifications. For example, a user may specify a delivery method for an advertisement (e.g., direct mailing to potential users), a quantity, a paper size, drop shipping information, and other like printing information. By way of example, after completing the design of an advertisement, a user may cause the service provider's server to deliver information files electronically to a printer for printing and distribution.

In another preferred embodiment, a user may specify the electronic delivery of a final or non-final advertisement to a target audience via e-mail or by posting it on one or more websites. This enables a user to produce both printed and electronic advertisements through the systems and methods of the invention.

The invention reduces the development time from months to weeks, (and in some cases, days, hours, or even minutes), thereby substantially increasing efficiency and reducing time to develop a final advertisement. The present inventions permits the designing advertising, printing and delivering of a final product to a target audience in a rapid, cost-effective manner.

The present invention is also directed to a software program developed to significantly reduce the time and frustration associated with current methods of developing a newspaper advertisement. This Internet based program allows a user (e.g., a store owner) to access a web site through the click of an icon, to select a template, a number of pages, and other information, and to point and click through a systematic method of circular development. Upon login, the store owner is preferably presented with updates and messages about new vendors, special sales or new additions to the program. Through a library of suppliers categorized by vendor, store department, SKU and product description, a store owner may select products that are desired to be advertised. The store owner may place the selected products into pre-designed templates, and may also take advantage of predetermined company advertisements. The ads preferably have sufficient flexibility to permit creativity, and yet sufficient standardization to keep the process easy. Upon completion of the design process to create an advertisement, a store owner may dictate print or display specifications to specify, for example, quantity, destination, pricing, drop ship and/or payment information. Preferably, the present invention is accompanied by help menus to assist the user in designing an advertisement. Preferably, the advertisement may be electronically transmitted to a professional printer for processing, printing and delivery. Upon receipt of the file, the professional printer may generate a preview (e.g. printer's proof or other hard-copy, electronic preview), which preview may be transmitted to the store owner (by way of facsimile, electronic mail, or courier) along with final pricing and a production confirmation.

The commercial printer may also provide a co-op claim calculations report. Turnkey co-op claim filing and processing may also be provided. Preferably, the program library (i.e., the database) of suppliers is updated regularly in order to reflect current available products and/or inventory.

The present invention requires a computer. Preferably, the computer includes a modem (e.g. dial-up connections such 14.4, 28.8 or 56K modem, DSL, cable), more preferably high speed, or other access interface (e.g. a T1 or T3 connection, satellite) to permit high speed access to a server. Preferably, the computer includes software to permit rapid and reliable access to the Internet, preferably the user has an account with an Internet access provider. In setting up an Internet connection, it may be desirable to utilize cache to keep local copies of frequently accessed pages, and thus reduce the demands on bandwidth to the network.

In one embodiment of the present invention, a user utilizes an Internet connection in order to access a web site on a host computer. The web site may, for example, be maintained and hosted by a commercial printer, a supplier, or an Internet Service Provider. The web site, when accessed, may request a user to log into the site by entering a username and password.

Generally, a user will specify the advertising format that is desired. Preferably, the user selects an advertising format from a plurality of advertising formats displayed on the computer screen. More preferably, the user selects from a pull down menu of advertising formats. An advertising format establishes the type of advertisement that is desired. Examples include circulars that are distributed by hand to potential users, newspaper inserts that are distributed as part of a newspaper, direct mail advertisements that are mailed directly to potential users, newsletters that are distributed to existing clients in order to keep them informed, and banners. Advertising materials that may be generated using the present invention are not limited to these examples, but may include any kind of print, digital, electronic or other form of advertisement, including, but not limited to, post cards, price cards, shelf-talkers, posters, signage, flyers, run-of-press (ROP) or other newspaper ads, billboards, presentations, brochures, collateral materials, letterhead, business cards, pocket folders, display materials, reports, and other types of advertisements, literature, and printed materials.

When the user selects an advertising format such as, for example, a newsletter, the present invention will provide the user an opportunity to prepare a custom newsletter. Preferably, the user will have the opportunity to specify the number of pages in the newsletter, as well as to include a table of contents, product photos, and descriptive text. In one embodiment, the present invention may present the user with a plurality of options from which the user may choose (e.g., 2 pages vs. 4 pages, double-sided vs. single-sided). Upon completion of the design phase, the newsletter may be processed and electronically transferred to a commercial printer for printing. The commercial printer may print the advertisement, providing the user with hard copies that may be distributed directly to existing customers as well as potential customers of the user. Alternatively, the user may duplicate the prints using the user's own facilities, thereby achieving further savings in time and money. Yet another alternative is for the commercial printer to process the advertisement after receiving the electronic files.

When the user selects a newspaper ad as an advertising format, the present invention will provide the user an opportunity to prepare a custom newspaper ad. Preferably, the user will have the opportunity to specify the size of the advertisement (e.g., full page, half page, quarter page, etc.), as well as to include product photos, pricing information (e.g. price, discount, sale, rate, coupon, etc.) and other descriptive text. Upon completion of the design phase, the ad is preferably transferred electronically to a newspaper company for inclusion in a newspaper. Alternatively, the ad may be transferred electronically for processing at a commercial printer, and then transferred electronically to a newspaper company for publication.

When the user selects a circular as an advertising format, the present invention will provide the user an opportunity to prepare a custom circular. Preferably, the user will have the opportunity to specify the number of pages in the circular, as well as to include product photos, pricing information and other descriptive text. In one embodiment, the present invention may present the user with a plurality of options from which the user may choose (e.g., 4 pages vs. 8 pages). Upon completion of the design phase, the circular is preferably transferred electronically for processing and printing at a commercial printer. The commercial printer may process and print the circular, and thereafter, provide hard copies, if desired, to a plurality of distribution points, including newspaper companies, direct mail facilities, and/or retail locations. Alternatively, the ad may be transferred electronically for processing at a commercial printer, and then transferred electronically to a newspaper company for publication.

Once an advertising format has been selected, a user may select a template that corresponds to the selected advertising format. In one embodiment, the present invention will provide a one-to-one correspondence between available advertising formats and templates. It is recognized and understood, however, that a selected advertising format may have a plurality of templates that correspond to the selected format. Moreover, different advertising formats may share one or more templates. In the case of a one-to-one correspondence, the selection of an advertising format may pre-ordain the selection of a template.

Preferably, after selecting an advertising format, the user will be provided by the present invention with an opportunity to select one of a plurality of templates that correspond to a selected advertising format. For example, if a circular is chosen as an advertising format, the user may be presented with a plurality of pre-defined templates for a circular. By selecting one of the pre-defined templates, the user will be able to save much time in designing a custom circular. It is understood and acknowledged, however, that the present invention may also be designed to permit a user to have even greater flexibility by presenting a template that provides a user with greater flexibility in terms of overall layout and design.

In a preferred embodiment, the present invention includes a database of templates, which database can be readily accessed and regularly updated. The database may be organized such that each template is allocated a record. Of course, the present invention contemplates that many other known means of organizing data and databases may be used to maintain a plurality of templates for purposes of this invention.

Once a template is chosen, the user is provided with an opportunity to customize the template. In the case where a template involves multiple pages, the user may be provided with an opportunity to select a page of the template to design and/or edit. In either event, the user may begin to customize the advertisement.

In a preferred embodiment, the user may be presented with options to include pre-defined product ads as well as new product ads that the user may create. A pre-defined product ad is one that was created previously and saved into memory (e.g., stored into a database or otherwise on a computer memory). An advantage of using pre-defined product ads is that the business or corporation may provide these as suggestions of, or requirements for, products to be offered for a particular ad and/or selling season. This provides the user with a desired base of products to consider, which further reduces the time to customize an ad. Alternatively, the pre-defined product ad may be saved as part of a template, in which case the next time a template is used, it may be defined to include the pre-defined product ad. Preferably, templates include additional areas that permit new products to be advertised. FIG. 1 illustrates a template that includes pre-defined advertisements, as well as providing blocks where custom product ads may be placed. One way of readily identifying areas where new product ads may be placed is by coloring an area of the template with a color. That way, a user readily sees a blank portion on the template and may "import" (or otherwise add by way of an editor) a new product ad.

In one embodiment, a template may include a predetermined window that permits a user to specify an expiration date for an advertisement, or even a range of effective dates for the advertisement. For example, the user may be presented with a menu to enter two dates "D1" and "D2", and the menu may automatically add text to the template that provides that the advertisement is good from D1 through D2.

Preferably, each template includes areas wherein a user may add custom text. Custom text may describe a particular product or refer to the overall advertisement (e.g., "Special Sale," "We Install" or "We appreciate your business."). A user friendly way of designing this feature is to provide an area on the template wherein text and/or images may be added simply by clicking on the area and pasting or inputting the text and/or images. Optionally, a menu may be used to enter custom text and/or images into an area on a template. For purposes of this document, areas wherein custom text and/or images may be placed shall be referred to as "advertisement areas" or, more simply, "ad areas." The ad area may be configured to be a square, a rectangle, a circle, or other geometric shape. Color may also be used to designate the physical limits of an ad area. An ad area may also be comprised of multiple boxes. For example, an ad area may have one box for an image file, one box for text, and one box for a price. (The use of the term "box" is not intended to be limited to any particular geometric shape.)

In a preferred embodiment, the template may include multiple ad areas, and the ad areas may be different shapes and/or sizes. Each of the multiple ad areas may be the same or a different color. Each of the multiple ad areas, preferably, may be easily modified in terms of placement on the template, as well as in terms of physical size. The ability to adjust the placement and/or the size of each ad area will facilitate the design process.

An ad area may be customized, for example, to emphasize a theme, such as Independence Day Sale, Memorial Day Sale, or even, Congratulations to the Local Graduating Class. When used for developing a theme, the ad area may be used to hold a graphic image (such as fireworks, flags, or a graduation cap) and/or text directed to the theme. Once a theme is developed, a user may chose to save the theme template as a custom template for future use.

An ad area on a template may be configured to receive one or more product references, thereby permitting a user to customize a template in the process of creating an advertisement. A user may customize a template by adding one or more product references to the template. A product reference may include images of a product to be advertised and/or custom text that describes one or more aspects of the product (e.g., price, size, weight, specifications, etc.). A product reference may include other information relating to the product, for example, SKU numbers, barcodes, trademarks, logos, etc. For purposes of this document, information concerning a product to be advertised such as, for example, one or more of text blocks which may include pricing information, pictures, characters, images, designs, sketches, colors, manufacturer logos, shall be referred to individually and collectively as a product reference. The overall appearance of the desired information (i.e. collection of chosen product references) for a particular product or products may also be referred to as product presentation.

Business rules may also be defined for, and applied to, each template to control customization aspects based upon manufacturer relationships or their contributions to the cost of the ad. Also, product ad areas may be locked, or may be bounded, by a variety of criteria, including manufacturer, brand, category, product, price, etc.

In a preferred embodiment, the system and the method of the present invention may provide the user with assistance in setting the price for a product to be advertised. For example, the present invention may provide the user with historical pricing information for the product being advertised (for example, a 50 foot long roll of masking tape), and/or pricing information on products within a particular category (for example, all rolls of masking tape). This feature will help to minimize the occurrence of pricing errors, which will help to minimize damage to good will associated with such errors. The pricing information provided by the pricing assistance program may include, lowest sale price, highest regular price, average sale price, competitor's sale pricing, etc.

It is contemplated that a user may desire to choose among multiple product references for the identical product. For example, a user may select a first product reference that includes an image of "Product A" and text describing Product A. Alternatively, a user may select a second product reference that comprises only text describing Product A. Alternatively, a user may select a third product reference that comprises only an image of Product A. In addition, the user may select a fourth product reference, which is similar in all respects to the first product reference, but which has a different layout of the image relative to the text. For example, the image may be larger in one product reference, and the price may be in a larger font or type size for emphasis.

The option to choose between the first product reference and the fourth product reference will permit a user to design an advertisement with consistency from product ad to product ad, or to choose layout variety from product ad to product ad. In a preferred embodiment, the user will have multiple product references for each given product, which references vary in both content as well as layout.

When designing an advertisement, a user may have the option of adding one or more product references to the template. Preferably, the user is presented with a plurality of product references from which to choose. The presentation of the product references on a computer screen may include an image of a particular product and/or text that describes one or more aspects of the product. Often, a user may have thousands of products that it may be interested in advertising. In such a case, it is preferable that the product references be organized by at least one methodology, and more preferably, by multiple methodologies. For example, product references may organized generally by generic category descriptions (say, "Books," "Magazines," "Clothing," "Gifts," "Hardware," etc.) It may be preferred that the generic categories have subcategories as well. For example a generic category such as "clothing" may be further categorized into "boots," "hats," "jewelry," "shirts," etc. Another methodology for organizing product references is by individual vendors who supply products. By clicking on one of the two windows, the user is provided with a pull-down menu of categories or vendors, and by selecting one of the provided references, the user is further provided with a portion or all of the product references that are associated with the user's prior selections (e.g., all of the hats, some of the shoes, etc.). Some examples of common search/pull down criteria are Manufacturer, Category, and Brand, but other, custom search criteria may be defined and used.

The system maintains in a memory storage device a list of product references. In a preferred embodiment, the present invention includes a database of product references, which database can be readily accessed and regularly updated. The database may be organized such that each product reference is allocated a record, which includes an image (or a reference marker that associates an image with the product), and text (or other information) that describes one or more features of the product (for example, title, price, weight, etc.). Of course, the present invention contemplates that many other known means of organizing data and databases may be used to maintain a plurality of product references for purposes of this invention.

The present invention may also utilize multiple databases of product references. This is especially useful when the user is a local office of a national chain. For example, the present invention may use one database of product references for products that are advertised nationally, and a second database of product references for products that are advertised locally. This will permit a user to participate in a national advertisement campaign, and yet permit the user to add products that are important to a local clientele.

In one embodiment, the user may be provided with the option of using a logo or trademark of a manufacturer for a particular product. This will permit potential users to readily identify the manufacturer of a product that is being advertised. In another embodiment, the optional logo and/or trademark may be included as part of a product reference, and may even be stored in a database of product references, with reference markers associating the logo with the appropriate products. Some available co-op funds may require that a logo be present for submission, payment, and/or collection.

The present invention also provides the user with the ability to input new product references. In a preferred embodiment the present invention would include a image capture device (such as a digital camera or scanner) which would permit the user to input an image of the product to be advertised. The new product reference optionally would include custom text that describes one or more aspects of the product. Preferably, the system would update its plurality of product references (e.g., by updating its database of product references) to include the new product reference and make it available for the user to select and add to a template.

In a preferred embodiment, the ad area on a template is configured to work with a product reference. For example, the product reference may be stored as an image file. If the image file is a fixed image of 2".times.2", then ad areas may be configured to accept images of the same size, namely, 2".times.2".

More preferably, the ad area on a template is adjustable such that the ad area may be adjusted in size in such a fashion that the product reference is automatically formatted and adjusted in size to fit the resized ad area. In this embodiment the invention takes the dimensions of an ad area (which may be pre-defined, or which may be measured dynamically) and then scales an image file (which image file may include text and/or photographs) of a product reference to fit the dimensions of the ad area. Of course, one skilled in the art will appreciate that this feature may be designed to operate in other fashions. Such an automatic resizing feature has the unexpected advantage of permitting the memory-stored product references to be automatically and dynamically adjusted without having to occupy additional memory space. Moreover, this feature has the surprising advantage of providing a user with great flexibility in designing a custom advertisement. This feature also has the additional advantage that product images may be stored in any dimension (and, in fact, may be stored at varying image dimensions).

An example will readily demonstrate the flexibility of an automatic resizing feature. A user designs a template to include five ad areas, each of which is of a different size. The user utilizes a single database of product references and places a different product reference in each of the five ad areas. Without any additional effort on behalf of the user, each of the five product references is adjusted in size to fit within each of the five user-defined ad areas. Moreover, because of the automatic resizing feature, a user could rearrange the product references on the same template, and the product references would be automatically resized and re-formatted to fit within its new ad areas. This feature permits quick and easy revisions to the layout of an advertisement.

The automatic resizing feature also has the unexpected advantage that it can readily accommodate new product references. If for example, in creating a new product reference, the scanner scans a photograph of a product that is 4".times.6", the new product reference can incorporate the entire image file. When the product reference is ready to be added to an advertisement, the system and method of the present invention may automatically adjust the size of the original image file (in this case, 4".times.6") to fit within the dimensions of the particular ad area in the designated template.

It is envisioned that the automatic resizing feature may operate on all formats of product references. For example, where the product reference is comprised entirely of text and stored in an ASCII format, the automatic resizing feature may adjust the font, type size and/or the layout of the text to fit into a predetermined ad area. Also, where the product reference is comprised entirely of an image and stored in an image format, the automatic resizing feature may adjust the size of the image to fit into a predetermined ad area. It is also envisioned that the automatic resizing feature may also make any other necessary conversions to accommodate a product reference. For example, if a pre-determined ad area is formatted to receive only an image file, and the selected product reference is stored as text, the automatic resizing feature may be expected to convert the text into a desired size such that the product reference may be placed upon the particular ad area.

In the case where an ad area is comprised of multiple boxes, the user may be presented with an opportunity to input a sale price for a particular item. The user may be presented with a "price window" which is specifically reserved for pricing information, or the user may be presented with a custom text window, wherein the user may enter pricing information as part of the custom text. If the ad area includes a box for an image file, the user may be presented with an opportunity to input an image file (for example, from the product reference database).

In a preferred embodiment, the user is provided with an opportunity to preview the advertisement as it will look when printed. One way to provide this opportunity is with a "preview" button which upon clicking will automatically display or print an image that looks very much like the final advertisement as it should be printed. The system may also electronically display a proof to be accepted before printing an ad. A proof may also be available in the "Archives" section of the program after publishing the ad prior to printing.

In a preferred embodiment, the system and the method of the present invention may provide the user with assistance in designing the layout of an advertisement. For example, the present invention may provide the user with an opportunity to identify one or more priorities that the present invention may use in advising the user on a preferred layout. Sample priorities may include the following: maximum size of product image; maximum number of advertised products per page; minimum separation between product references; maximum font or type size; minimum font or type size; predetermined number of product references per page; grouping by manufacturer; and grouping by product category. For purposes of this document, this feature shall be referred to as priority-based layout assistance. The priority-based layout assistance may be utilized on a template that has already been designed by the user, in which case the assistance program may be used to optimize the layout.

In another preferred embodiment, the user may submit a template and a list of product references to be automatically laid-out by the priority-based layout assistance program. It is contemplated that a user may reset priorities and then preview the results based on the new list of priorities. The priority-based layout assistance will work especially well when each product being advertised has multiple product references from which the assistance program may choose. For example, if a top priority is maximum product image size, the assistance program may layout the initial draft advertisement using those product references with the largest images. This means that the product references may include information describing the differences between the various product references for each product. For example, the database of product references may be designed to hold up to 10 product references for each product, whereby the product references are organized from largest product image to smallest product image. In any case, the priority-based layout assistance may provide better refinement in circumstances when there are multiple product references for each of the products being advertised.

When the advertisement has been designed (i.e., when the template has been designed and edited to include all of the products and information that the user decided to include), the user may review the preview as displayed by the computer or the present invention may generate a hard-copy preview or printer's proof for the user to review. How and where the proof is generated depends upon the advertising format that is being used. For example, for a black and white advertisement, the proof may be generated at a printer operated by the user (on the premises of the user). If a multi-colored glossy circular is desired, the proof may be generated by a professional printer that is located remotely relative to the user. To generate a preview, the present invention may transmit electronically the advertisement to a commercial printer, who may process and create an electronic preview or print a hard-copy proof of the final advertisement.

A user may review the preview to confirm that the draft advertisement as created using the present invention is acceptable in terms of content, design, quality, etc. If the user approves of the preview, the final advertisements may be printed, and preferably, in accordance with any printing specification that may have been provided by the user and/or generated by the program. In addition, the invention may offer the user an automatic checking feature of prices, quantities, inventory availability (e.g. in store availability or availability from distributor or manufacturer facilities) or other options (e.g. size, color, composition) against preset or predetermined parameters.

It is contemplated that the present invention may be implemented in a manner that provides an account for a user to access, and further that the account provides access to a memory storage device where the user may store data and other information relevant and/or unique to the user. For example, a host computer that may be accessed through an Internet connection may store product references, templates, and other custom information for a user, such that when a user logs into its account, the information is readily available. This approach will also permit certain additional convenience features. For example, a user's files, data, orders, and other information may be automatically saved for the benefit of the user. Further, saving can be set up to occur automatically at periodic intervals, as well as automatically upon the termination of an account session (e.g., upon log-off). The user may also be presented upon a subsequent login, the option of editing a prior session's advertisement or creating a new advertisement. Automatic saving features have the advantage of significantly reducing the risk of lost data, which consequently helps to reduce the time associated with creating subsequent advertisements.

In one embodiment of the present invention, the methods and systems may provide delivery options. For example, a user may chose from a plurality of delivery options that include a) a direct mailing to potential users whose names and addresses are provided by the user, b) a direct shipping to a newspaper publisher, and c) a direct shipping to the user at one or multiple locations. When a direct mailing is selected, the user may preferably provide a data file of names and addresses of persons who will receive hard copies or electronic direct mailings. The data file may be provided, for example, via the Internet or a storage media (e.g. hard drives, zip disks, CDs, diskettes).

In one embodiment of the present invention, the methods and systems may provide print schedules. Print schedules permit a user to plan the logistics of meeting a particular advertising goal. For example, a print schedule may include two dates: 1) a distribution date—which is the date by which a user may wish to have its advertisements distributed; and 2) a publication deadline—which is a date by which the proposed advertisement should be completed in order to meet the distribution date. These dates are typically set by the program administrator based upon the requirements of the user's business and the schedules of the commercial printers that the user will be using in the printing process. In another embodiment these dates may also be set by a user.

In one embodiment, a user may be presented with a plurality of schedules from which the user may choose. In another embodiment, the user may input a distribution date, and the present invention may calculate the publication date based upon a pre-determined formula (for example, a particular printer requires two weeks notice to print a job).

In another preferred embodiment, the user may submit a template and a list of product references to be automatically laid-out using the pre-defined template and the order of the list of product references. It is contemplated, as well, that a user may define a set of priorities and generate a draft advertisement based on the list of priorities. The priority-based layout assistance will work especially well when each product being advertised has multiple product references from which the assistance program may choose. The advantage of this approach is that the user minimizes its demands on the network interface (e.g., a modem connection). By transmitting the template information and the list of product references, the user avoids having to deal with multiple, large image files, and thus, a significant time savings may be realized. Moreover, the system and method of the present invention contemplates that the host computer may compile a draft advertisement using the template information and the list of product references, which draft advertisement may be transmitted directly from the host computer to commercial printers. In this fashion, the bandwidth demands of the user's network interface are lessened, resulting in a savings on the development time and increased reliability.

Once the ad is created, approved, and submitted for publication, an important subsequent step is to obtain reimbursement for the ad expense. It will be appreciated that reimbursement does not occur until a request for reimbursement, e.g., an invoice, is submitted. It will also be appreciated that, the sooner the bill is submitted, the sooner payment can generally be had. Therefore, it is preferred to generate a bill not later than immediately after the ad has been approved and submitted. The present invention therefore includes a co-op calculation feature which generates invoices upon demand, or as programmed.

Figure 8A:
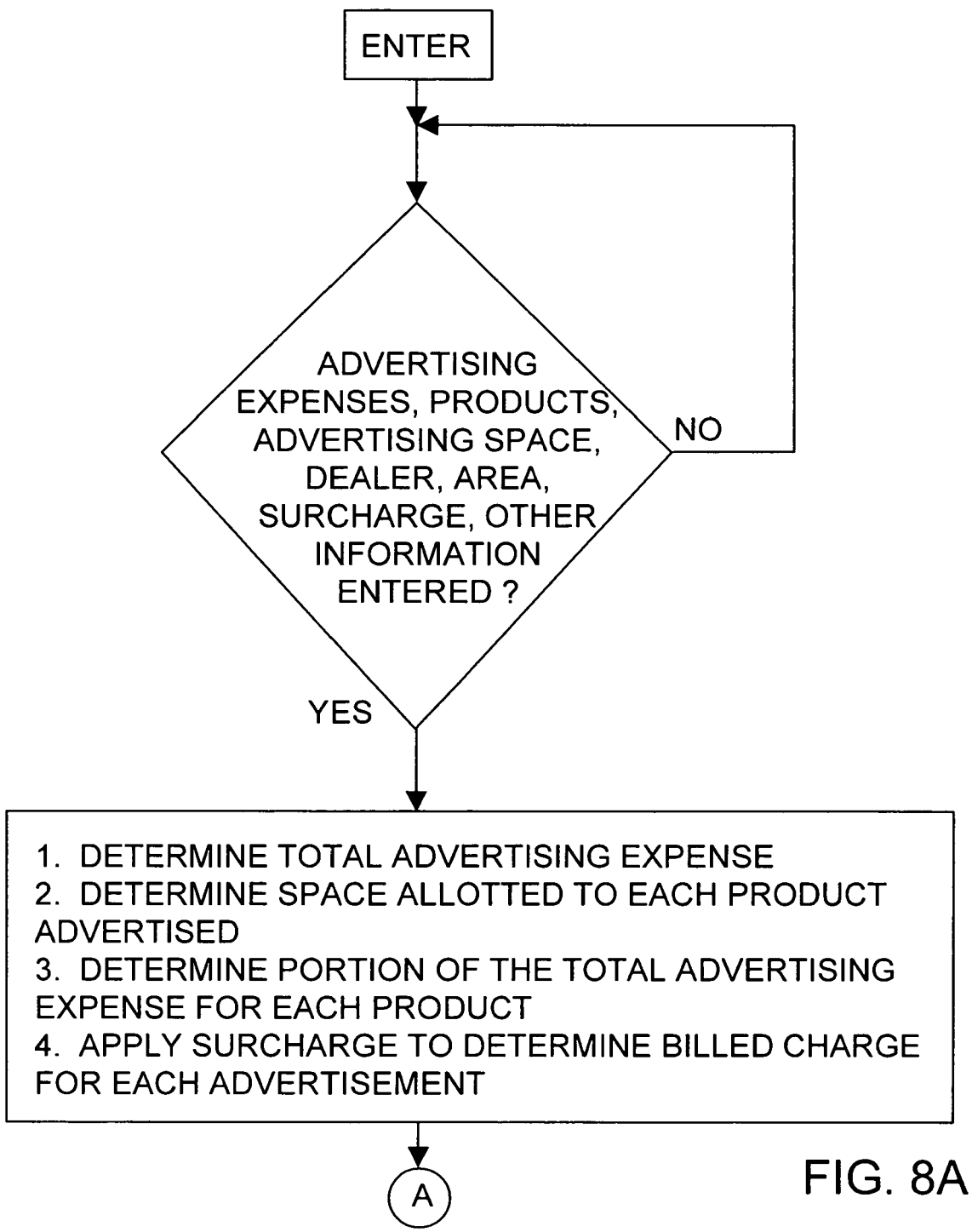
FIGS. 8A and 8B illustrate the steps of the co-op calculation feature.
Figure 8B:
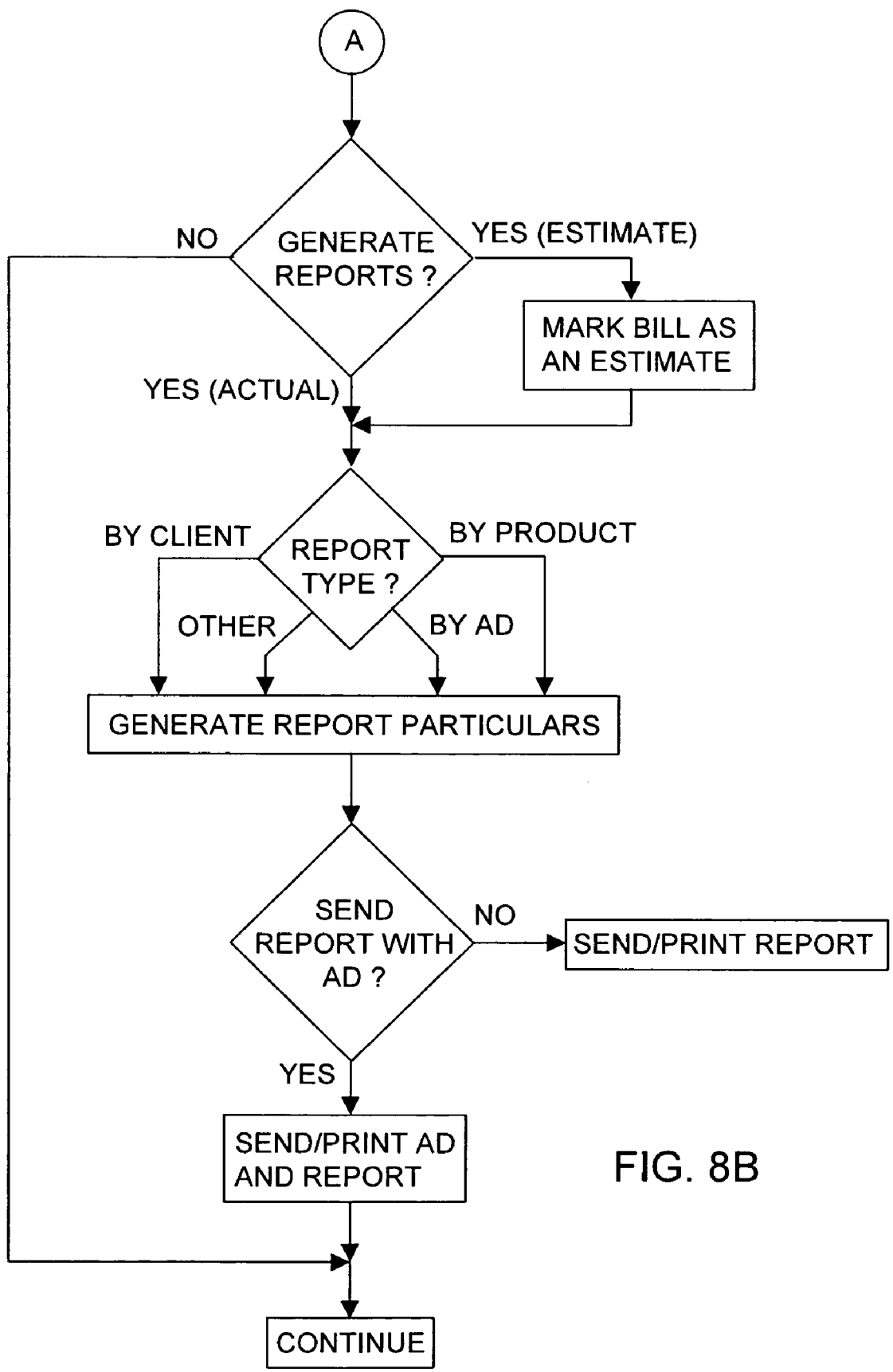

FIGS. 8A and 8B illustrate the steps of the co-op calculation feature. This feature is preferably performed after step 316 of FIG. 3, that is, after the advertisement has been placed in final form, approved, and submitted for publication. However, it may be performed at an earlier stage, and updated as and/or if changes are made, and/or it may be used to provide the user with real-time estimates of the cost of the advertisement. Real-time estimates avoid the unpleasant situation where the user submits the advertisement and later realizes that the advertisement costs more than is in the budget, or later realizes that the entire budget was not used and more and/or different advertising could have been ordered. In the first case, the user may have to absorb the extra-budget costs, and in the second case the user may have to return unspent advertising dollars, neither of which is a desirable outcome.

As shown, the user enters the advertising expenses, product information, advertising space, dealer information, surcharges, and other information into the system. The system then determines the total advertising expense, determines the space allotted to each product advertised, determines a portion of the total advertising expense for each product based on the space used by the advertisement, and then applies a co-op amount (an upcharge or a surcharge) to arrive at the billed charge for each advertisement. The space used by each product may be a percentage of the total space, or may be a percentage of the total space actually used by advertisements, or may be the area, e.g., in square inches, of space used by the advertisement, or some combination thereof. The co-op amount may be any desired amount, for example, 50%. It will be appreciated that the co-op amount need not be applied only at the end of the calculations, but may be applied at an earlier stage or to specific items, such as to the advertising expenses, the area used, and/or a combination thereof, and may be modified if and when desired.

The co-op calculation feature also allows the user to enter other information into the database, such as the dealer, region or area from where the advertisement is being placed, the region or area to where the advertisement is being targeted, which product(s) and/or manufacturer(s) are being advertised, sales, times, dates and/or durations of advertising, demographic information such as buying habits, customer information, product preferences, zip codes, area codes, addresses, etc. Demographic information may be provided for each entry, individually, or for a group of entries collectively. The information provided to, and generated by, the co-op calculation feature may be used to generate one or more of a variety of reports, which can be customized for the user and even for each client. The reports generated may include, for example, a general report of all products advertised in any given advertisement, and/or in any given publication, and/or individual reports for each product. This information can also be used by the co-op calculation feature to provide an advertising tracking tool which generates a variety of reports. The reports generated may include, for example, a general report of all products advertised in any given ad, individual reports for each product, advertising activity by dealer, region or at large, which products or manufacturers are being advertised, sales vs. advertising expenditures, a comparison of annual advertising productivity, and/or reports tracking other desired cycles, trends, and facts, tracking of available co-op funds with automatic deduction of funds based on the co-op reimbursement requested, etc. Again, this allows for reports in the format and/or with the information demanded by the client for reimbursement. This allows the user to quickly and conveniently generate the report(s) needed by the user and/or demanded by the client, and which can be customized for the user and/or the client. The co-op calculation feature thus provides for instant and convenient reporting and tracking of advertising information. The report selection and generation capability allows users to more quickly calculate co-op requests, to more quickly submit co-op requests to clients, such as manufacturers, wholesale and retail stores, and service providers, and, hopefully, to more quickly receive reimbursement. This also allows the user to review the revenue generated from each client or product ("product" including services provided), the expenses incurred for each client or product, the net income for each client or product, and the type and number of ads for each client or product, so that the user can determine which clients and/or products or types of clients and/or products the user should most vigorously pursue in order to maximum the user's revenue.

Preferably, but not necessarily, the database is a standard, formatted database which is used by or uploaded for each user, such as customer. A standard database allows the user to easily manage the database and/or batch process data into the database; the user can also add, delete, or modify entries in the database, including, but not limited to, the demographic information. In an alternative embodiment, the database is a standard, formatted database having entries therein for use by the user. For example, the database may be a compilation of names, addresses, telephone numbers, status as a registered voter, status as the registered owner of a lot and/or building, distance to nearest school, state and/or federal congressional and senatorial district, etc. In this alternative database, management of the information by one client preferably does not alter the database, but merely annotates the database to indicate the change and the client making the change so that a client only is affected by the changes that were made by itself.

In addition to the reports mentioned above, the database can also be sorted by the demographic information to generate a target list. This target list may then be sent along with an advertisement which is sent to a printing company. The printing company can then use the list to, for example, produce labels for direct mailing of the advertisement, or to insert one advertisement for a publication which will be distributed to a particular demographic group, and a different advertisement for a publication which will be distributed to another particular demographic group, which may or may not include members of the first demographic group. The target list may also be sent separately from, sent as an attachment to, and/or embedded within the advertisement. The target list may also be downloaded to or by the user so that the target list may be formatted by the user for printing labels on a local or remote printer.

The database may also be downloaded by the user at any time for other purposes, such as consolidation of information into the user's management system, backup, off-line review, etc.

The database may also, if desired, be partitioned into segments, with different users having different or no access rights to specified segments. Use of authorized user names, passwords, and other security measures to control access to information stored on a computer database are well known and need not be belabored here.

Figure 9:
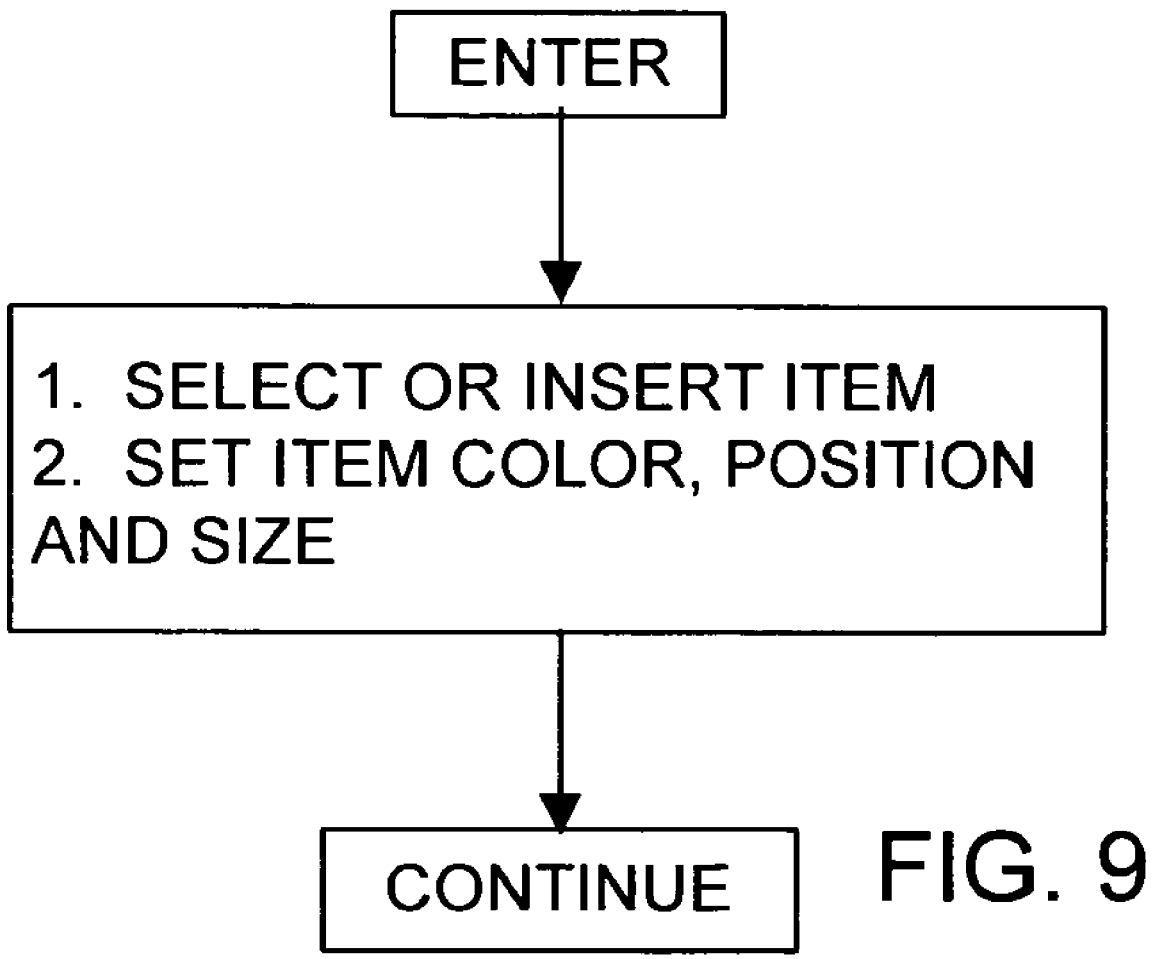
FIG. 9 illustrates the process of customizing an advertisement.

Turn now to FIG. 9, which illustrates the process of customizing an advertisement. This is preferably performed as part of one of steps 302-314, but may be performed during any one or more of these steps. When the user selects the advertising format, or the template, or the product reference, the user may customize the advertisement by inserting items such as images, text, logos, etc. These items may also be in a database, or may be imported from another program, or may be created by the user at that time. Preferably, all items have a transparent background unless they are a lifestyle image or a square cut and have an image that encompasses the allowable area. This allows an item with a transparent background to be placed over an item for another product but the product will not be completely hidden. For example, a store name and a price may be in red, on a transparent background, and placed over a product reference showing a yellow shirt or towel. This allows the user to place images anywhere on a page, with the colored background of the ad surrounding the image, so that the user is no longer constrained to place an image into a white box. This allows the information to be displayed along with the product without requiring that the product space be reduced to make space for the information, and without the background of the information obscuring the product. This improves the aesthetics of the advertisements and allows for a more finished appearance, i.e., a more retail look. The system also allows the user to overlap ad elements, to create layers, and to dynamically direct the placement of ad elements anywhere in the ad.

Other embodiments and uses of the invention will be apparent to those skilled in the art from consideration of the specification and practice of the invention disclosed herein. All references cited herein, including all U.S. and foreign patents and patent applications, are specifically and entirely hereby incorporated herein by reference. It is intended that the specification and examples be considered exemplary only, with the true scope and spirit of the invention indicated by the claims below. As will be easily understood by those of ordinary skill in the art, variations and modifications of each of the disclosed embodiments can be easily made within the scope of this invention as defined by the claims below.

The invention claimed is:

1. A method to create an advertisement,
comprising one or more computers implementing:
obtaining at least one product reference;
displaying on a display device of a computer at least one pre-defined advertisement template for selection by a user;
obtaining the selection of at least one pre-defined advertisement template from the user:
automatically arranging the at least one product reference within an area of the selected template to create the advertisement; and
displaying on the display device the template created advertisement to the user.

2. The method of claim 1, wherein the advertisement is an electronic advertisement for at least one of e-mail or websites.

3. The method of claim 1, further comprising the step of:
displaying on a display device of the computer at least one advertising format for selection by the user, wherein each template corresponds to at least one advertising format.

4. The method of claim 1, wherein the at least one product reference is selected from the group consisting of: a product reference that is uploaded by the user, and a product reference from a database of product references.

5. The method of claim 4, wherein there are a plurality of databases coupled to the computer.

6. The method of claim 4, wherein the database is accessible by a third party to at least one of add new product references and update existing product references.

7. The method of claim 6, wherein the third party is a vendor or a manufacturer.

8. The method of claim 1, wherein the advertisement is a website.

9. The method of claim 1, wherein the user can alter the template.

10. The method of claim 1, wherein the product reference includes at least one of product information and an image.

11. The method of claim 10, wherein the product information is at least one of a product description, a product price, and a product quantity.

12. The method of claim 11, wherein the user can alter the font used for the product information.

13. The method of claim 1, wherein the product reference is adjustable.

14. The method of claim 13, wherein the product reference is automatically adjusted to fit the template.

15. The method of claim 1, wherein there are a plurality of product references and the product references are automatically arranged based on a set of priorities.

16. The method of claim 1, wherein the method is an internet based method.

17. A method to create an advertisement, comprising one or more computers implementing:
displaying on a display device of a computer at least one template to a user for selection;
obtaining the selection of the at least one template by the user via an input device of the computer;
obtaining at least one product reference selection, wherein the at least one product reference is chosen by the user from a database of product references or uploaded by the user;
automatically arranging the at least one product reference on an area of the selected template to create the advertisement; and
displaying on the display device the created advertisement to the user.

18. The method of claim 17, wherein the advertisement is an electronic advertisement for at least one of e-mail and websites.

19. The method of claim 17, further comprising the step of:
obtaining at least one advertising format selection from the user, wherein each template selection corresponds to the at least one advertising format selection.

20. The method of claim 17, wherein the advertisement is a website.

21. The method of claim 17, further comprising the step of obtaining instructions from the user to alter the template.

22. The method of claim 17, wherein the product reference includes at least one of product information and an image.

23. The method of claim 22, wherein the product information is at least one of a product description, a product price, and a product quantity.

24. The method of claim 23, further comprising the step of obtaining instructions from the user to alter the font used for the product information.

25. The method of claim 17, wherein the product reference is adjustable.

26. The method of claim 25, further comprising the step of automatically adjusting the product reference to fit the template.

27. The method of claim 17, wherein there are a plurality of databases coupled to the computer.

28. The method of claim 17, wherein the database is accessible by a third party to at least one of add new product references and update existing product references.

29. The method of claim 28, wherein the third party is a vendor or a manufacturer.

30. The method of claim 17, wherein there are a plurality of product references and the product references are automatically arranged based on a set of priorities.

31. The method of claim 17, wherein the method is an internet based method.

* * * * *

UNITED STATES PATENT AND TRADEMARK OFFICE
CERTIFICATE OF CORRECTION

| | | |
|---|---|---|
| PATENT NO. | : 7,774,715 B1 | Page 1 of 1 |
| APPLICATION NO. | : 11/316345 | |
| DATED | : August 10, 2010 | |
| INVENTOR(S) | : Jon C. Evans | |

It is certified that error appears in the above-identified patent and that said Letters Patent is hereby corrected as shown below:

On the title page, Item (63) Related U.S. Application Data, line 2 please delete "which" and insert therefore --and--

On the title page, Item (60) Related U.S. Application Data, please delete "Provisional application No. 60/213,484, filed on Jun. 23, 2000." and insert therefore --Provisional application No. 60/213,484, filed on Jun. 23, 2000, and provisional application No. 60/420,037, filed on Oct. 22, 2002.--

In column 1, line 9, please delete "which" and insert therefore --(which claims priority to U.S. provisional Application Ser. No. 60/420,037, filed Oct. 22, 2002, entitled "System And Method For Computer-Created Advertisements"), and--

Signed and Sealed this
Thirty-first Day of May, 2011

David J. Kappos
*Director of the United States Patent and Trademark Office*